(12) United States Patent
Riley et al.

(10) Patent No.: US 6,342,122 B1
(45) Date of Patent: Jan. 29, 2002

(54) UV POST CURABLE PRESSURE SENSITIVE ADHESIVES FOR MEMBRANE SWITCH APPLICATIONS AND THEIR PRODUCTION

(75) Inventors: Daniel Joseph Riley, Dublin; Raymond Scott Harvey, Worthington; Harvey Joseph Richards; Peter Albert Yurcick, both of Columbus, all of OH (US)

(73) Assignee: Ashland Chemical, Inc., Columbus, OH (US)

( * ) Notice: Subject to any disclaimer, the term of this patent is extended or adjusted under 35 U.S.C. 154(b) by 0 days.

(21) Appl. No.: 09/633,509

(22) Filed: Aug. 7, 2000

(51) Int. Cl.[7] ............... C08J 3/28; C08L 33/04; C08F 2/50; C09J 133/04
(52) U.S. Cl. .................. 156/275.5; 156/275.7; 156/327; 156/332; 428/355 AC; 428/480; 428/500; 522/8; 522/16; 522/42; 522/45; 522/46; 522/48; 522/59; 522/93; 522/106; 522/121; 526/318.2
(58) Field of Search ............... 522/79, 80, 106, 522/121, 107, 93, 8, 42, 46, 113–123, 16, 45, 48, 59; 526/328, 318.2; 428/355 R, 355 AC, 480, 500; 156/275.7, 275.5, 327, 332

(56) References Cited

U.S. PATENT DOCUMENTS

| 3,992,276 | A | * | 11/1976 | Powanda et al. |
| 4,433,223 | A | * | 2/1984 | Larson et al. |
| 4,665,106 | A | * | 5/1987 | Ohta et al. |
| 5,062,916 | A | * | 11/1991 | Aufderheide et al. |
| 5,141,989 | A | * | 8/1992 | Jung et al. |
| 5,360,873 | A | * | 11/1994 | Ohkawa et al. |
| 5,466,723 | A | * | 11/1995 | Dotson |
| 5,502,085 | A | * | 3/1996 | Ohura et al. |

* cited by examiner

Primary Examiner—Susan W. Berman
(74) Attorney, Agent, or Firm—Mueller and Smith, LPA

(57) ABSTRACT

An solvent-based pressure sensitive adhesive (PSA) having improved shear adhesion is composed of an acrylic-based PSA resin, an ethylenically unsaturated polyester, an ultraviolet radiation (UV) photosensitizer, and fugative organic solvent for the acrylic-based PSA resin. The PSA is cured by evaporation of the fugative organic solvent coupled with heat and UV irradiation or UV irradiation alone. Such PSA has improved shear adhesion by dint of the addition of the ethylenically-unsaturated polyester and an ultraviolet radiation (UV) photosensitizer. A method for adhering two substrates using the PSA includes applying the PSA to one or both of substrates. The solvent in the PSA is evaporated from the applied PSA. Finally, the polyester component of the applied PSA is cured by exposure of the applied PSA to ultraviolet (UV) radiation.

30 Claims, No Drawings

UV POST CURABLE PRESSURE SENSITIVE ADHESIVES FOR MEMBRANE SWITCH APPLICATIONS AND THEIR PRODUCTION

CROSS-REFERENCE TO RELATED APPLICATIONS

None

STATEMENT REGARDING FEDERALLY SPONSORED RESEARCH

Not applicable.

BACKGROUND OF THE INVENTION

The present invention generally relates to adhesive compositions and more particularly to improving the shear adhesion and gasoline resistance of pressure sensitive adhesives (PSA's). The disclosed PSA's, then, will find wide utility for membrane switch applications, especially in rugged environments where, say, resistance to solvents (e.g., gasoline) is required.

The ASTM subcommittee on Membrane Switches defines a "membrane switch" as: "A momentary switch device in which at least one contact is on, or made of, a flexible substrate." To be more specific, all of the following conditions or features often are said to be necessary in order to be truly classified as a membrane switch:

(1) direct ohmic contact—the poles of the switch must make physical contact, i.e., cannot be non-contact type like capacitive, ferrite core, or Hall effect;

(2) momentary action—upon release, the poles immediately separate as the flexing membrane returns to its original position;

(3) low voltage application—a membrane switch is designed to be used in low voltage, d.c. Logic-level-signal applications; and (4) membrane layer—a think pliable layer that carries one pole, both poles, or that flexes during the switching operation used to short both switch poles together.

The Membrane Switch Manufacturers' Association defines a "membrane switch" as having the following two essential characteristics: a switch, the actuator of which is a membrane, shall involve mechanical input via at least one component which is a membrane and an integral part of the switch; and its operation shall result in a change of electrical state between at least two terminals. See, for example, the Industry Standard for Membrane Switches, Issue No. 2, July 1991, published by The Membrane Switch Manufacturers' Association, London, England.

A membrane switch typically is composed of up to three layers. The intermediate layer is a flexible screened layer with movable contacts. An insulator through which openings are cut at the aligned contact points separates it from the bottom layer. When pressure is applied to the top contact, the film or membrane flexes toward the stationary circuit contact until the circuit is closed. Removal of pressure breaks the contact and the circuit is opened by virtue of the flexible membrane returning to its normally open, separated position. Generally, a top layer is laminated to the intermediate layer. This top layer has graphics and/or alphanumeric characters that locate the switch push point for the user and may also describe the operation of the membrane switch.

In most cases the faceplate or top layer for the membrane switch is printed on polyester or polycarbonate material. Polyester is more resistant to chemicals found in industrial settings and is better suited for use with tactile feedback switches because it will not crack over time. Polycarbonate is optically clear at any thickness, provides a cleaner emboss, and will operate at higher temperatures. Thus, the designed use of the membrane switch ordinarily will dictate the materials of construction.

Laminate of membrane switch layers typically is accomplished with adhesives and often with PSA's. Not only must the PSA perform its intended function of laminating the flexible plies together, but it also must withstand the rigors of use of the membrane switches. When a membrane switch is to be used in an industrial environment or location (industrial or retail) whereat gasoline and similar solvating materials are being used and/or transferred, the PSA also must be able to display gasoline resistance to be considered a acceptable material for membrane switches. Too, the PSA of choice also must possess adequate tack, peel, and shear performance. In this regard shear adhesion is an important characteristic for membrane switch adhesives.

BRIEF SUMMARY OF THE INVENTION

A solvent-based pressure sensitive adhesive (PSA) having improved shear adhesion is composed of an acrylic-based PSA resin, an ethylenically unsaturated polyester, an ultraviolet radiation (UV) photosensitizer, and fugative organic solvent for the acrylic-based PSA resin. The PSA is cured by evaporation of the fugative organic solvent coupled with heat and UV irradiation or UV irradiation alone. Such PSA h as improved shear adhesion by dint of the addition of the ethylenically-unsaturated polyester and an ultraviolet radiation (UV) photosensitizer. A method for adhering two substrates using the PSA includes applying the PSA to one or both of substrates. The solvent in the PSA is evaporated from the applied PSA. Finally, the polyester component of the applied PSA is cured by exposure of the applied PSA to heat and/or ultraviolet (UV) radiation in the presence of an appropriate initiator(s).

DETAILED DESCRIPTION OF THE INVENTION

The first ingredient of the inventive adhesive is an ethylenically-unsaturated acrylic-based polymer or oligomer which can be cured in the presence of free radicals that are generated from the free-radical initiator in the adhesive. The major ingredient in the copolymer(s) broadly is a $C_4$–$C_{18}$ alkyl (meth)acrylate monomer and advantageously a $C_4$–$C_{12}$ alkyl (meth)acrylate monomer. n-Butyl acrylate and 2-ethylhexyl acrylate are two monomers that have proven advantageous in forming the copolymer(s) of the present invention, though other straight chain, alicyclic, and cyclic alkyl (meth)acrylate monomers may be used as is necessary, desirable, or convenient. By convention, the parentheticals used herein designate optional content, ie. (meth)acrylate means "acrylate" or "methacrylate", and the same is true for the parenthetical plurals used herein. Also by convention, copolymer and interpolymer both mean a polymer of two or more monomers. The selection of the terms as used herein is for the clarity of understanding and not by way of limitation.

Referring now to suitable polymerizable monomers, broadly, such monomers include any ethylenically unsaturated monomer or oligomer which can be (co)polymerized in the presence of the initiator. In adhesives technology, acrylic or acrylate compounds find wide acceptance in industry. Another suitable class of ethylenically unsaturated compounds are vinyl compounds, while a third class are compounds containing backbone ethylenic unsaturation as typified by ethylenically unsaturated polyester oligomers.

Referring with more particularity to reactive acrylic or acrylate monomers or oligomers, a variety of monoacrylate monomers find use in accordance with the present invention. Monoacrylates include, for example, allyl (meth)acrylate, $C_1$–$C_{12}$ alkyl and cycloalkyl (meth)acrylates, such as, for example, butyl acrylate, 2-ethylhexyl acrylate, isooctylacrylate, amyl acrylate, lauryl acrylate, iso-propyl acrylate, and the like, and corresponding monomethacrylates which include, for example, benzyl methacrylate, stearyl methacrylate, decyl methacrylate, cyclohexyl methacrylate, and the like, and mixtures thereof. The foregoing monomers are merely representative and not limiting of the list of acrylate and methacrylate monomers suitable for use in the present invention, as those skilled in the art will appreciate.

The organic solvent, or often mixture of solvents, must be effective in solubilizing the acrylic-based PSA resin. Such solvents broadly include alcohols, esters, ethers, or aromatic solvents, and mixtures thereof. Representatives of such solvents include, for example, ethyl acetate, butyl acetate, methyl ethyl ketone, cyclohexanone, acetone, toluene, xylene, benzene, cyclohexane, and the like, and mixtures thereof. Ethylacetate and toluene are presently preferred solvents. The proportion of solvent is adjusted to provide a non-volatile solids content of the reaction product of between about 25% and 75%.

Unsaturated polyesters additionally can be used in the present invention. These materials are synthesized, for example, by reacting maleic anhydride or a mixture of maleic anhydride and other ethylenically-unsaturated diacids with a diol or a mixture of diols. The mixture is heated in the presence of a catalyst to temperatures sufficient to remove the water formed in the condensation reaction. These materials have molecular weights of, for example, about 1,000–100,000 (Mn), and have the free-radically polymerizable unsaturated groups present in the polymer backbone.

Additional conventional additives may be incorporated into the adhesive composition, including, for example, wetting agents, pigments, antioxidants, ultraviolet absorbers, antistatic agents, lubricants, fillers, opacifying agents, antifoam agents, rheology agents, and the like and mixtures thereof. The adhesives may be applied to one or both sides of the film face stock in a conventional manner, for example, by spraying, knife coating, roller coating, casting, drum coating, dipping, and the like. Indirect application using a transfer process with silicon release paper also can be used. After the adhesive has been applied, the coated film face stock is dried conventionally.

Ultraviolet photosensitizers or sensitizers are combined with the monomers or prepolymers used to form the polymeric networks for achieving cure in the presence of UV radiation. Useful UV sensitizers or photosensitizers include halogenated polynuclear ketones such as disclosed in U.S. Pat. No. 3,827,957; and organic carbonyl compounds selected from alkyl phenones, benzophenones, and tricyclic fused ring compounds as disclosed in U.S. Pat. No. 3,759,807. Further useful UV sensitizers include carbonylated phenol nuclear sulfonyl chlorides, such as set forth in U.S. Pat. No. 3,927,959. Additional useful photosensitizer combinations particularly suited for pigmented formulations are a combination of sensitizers comprising aromatic carbonyl compounds, aromatic aldehydes or aromatic ketones, and a synergistic sensitizer of about 0.05% to about 3% of 2,2'-dithiobis(benzothiazole), as set forth in U.S. Pat. No. 3,847,771. Typically, at least about 0.5% by weight of the UV sensitizer, and preferably about 1%–5% sensitizer, is added to the ingredients and thoroughly mixed or otherwise dispersed in the liquid carrier ingredients.

In practicing the present invention, the modified PSA is used to adhesively joint two substrates. Heat may be applied to assist is solvent expulsion from the PSA. Thereafter, UV irradiation, optionally with heat, can be used to post-cure the unsaturated polyester. By this technique, the resistance of the PSA to gasoline is improved as is the shear adhesion of the modified PSA.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLE

The following test procedures and reagents were used in the Example:

1. 180° Peel Test: PSTC-1 (November 1975), Pressure Sensitive Tape Council, Glenview, III. Results of this test are reported in pounds/inch for a 1 in strip.
2. 178° Shear Test: PSTC-7 (November 1975). Pressure Sensitive Tape Council. Results of this test are reported in hours/500 gm/0.25 in$^2$ at 22° C.
3. Polyken Tack Test: This test is conducted on a Polyken, Jr. Probe Tack Tester (Polyken is a trademark of the Kendall Company) supplied by Testing Machines, Inc. (Amityville, N.Y.) under the following conditions:

| | |
|---|---|
| Probe: | 304 SS. 0.5 cm. diameter probe with a 280 grit abrasive finish. |
| Dwell Time: | 1 second |
| Probe Contact Pressure: | 100 gm/cm$^2$ |
| Probe Retraction Rate: | 1 cm/sec. |
| Annular Weight: | 20 gm.-100 gm/cm$^2$ pressure of a 0.5 cm. diameter probe |
| Procedure: | A one-inch square of MYLAR ® polyester film coated with the adhesive is placed on top of the annular weight so that the hole is completely covered by the adhesive area and this assembly placed in the weight carrier well. The machine is activated and the sequence of probe pressure and probe retraction automatically accomplished. The force required to free the probe from adhesive coated film, measured in grams/cm$^2$ is read from the indicator dial on the machine. |

4. Adhesive Failure Code:
   C=clean, adhesive failure
   gh=ghosting
   PT=partial transfer
   TT=total transfer
5. Ingredients
   Aroset 1860-A-45 acrylic PSA; typical properties 44–46% solids, 8250–13750 cps (Brookfield viscosity @ 77° F.), ethyl acetate/toluene/heptane/isopropanol solvents (5:33:7:6 ratio), 7.9±0.2 lb/gal density 20°–73° F. flash point range (SETA) (Ashland Chemical Company, Columbus, Ohio)

Aropol Q 6585 Unsaturated polyester resin; typical properties @ 25° C.: 65% nv solids, 900 cps (Brookfield viscosity), color 2 Gardner (max), AN 30, 0.01% water max (Karl Fisher), 9.3 lb/gal density (Ashland Chemical Company, Columbus, Ohio)

Sartomer CN-966J75 is an aliphatic polyester-based urethane diacrylate oligomer blended with 25% isobornyl acrylate; typical properties: clear liquid, 45 color alpha, 8.791 lb/gal density, 238% elasticity, functionality of 270 modulus (psi %), 25% monomer content, 1.4757 refractive index (25° C.), 428 psi tensile strength, Tg of −33° C., viscosity of 4240 cps @ 60° C. (Sartomer Company, Exton, Pa.)

Irgacure 500 is an equal mixture of 1-hydroxycyclohexylphenylketone (I) and benzophenone (II), as shown below:

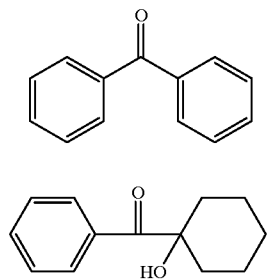

A PSA was formulated as follows:

TABLE 1

| Ingredient* | Amount (g) |
| --- | --- |
| Aroset 1860-A-45 PSA | 702.26 |
| Aropol Q 6585 Unsaturated polyester | 105.33 |
| Ethyl acetate solvent | 179.58 |
| Sartomer CN-966J75 | 11.85 |
| Irgacure 500 | 0.99 |

The adhesive formulation was coated to a 2 mil dry film onto a silicon release liner and transferred to clear PET (polyethylene terephthalate) face stock and air dried for 15 minutes followed by thermal treatment at 200° F. for 8 minutes.. One lot of the adhesive film then also was post-cured with about 1925 mJ/cm² UV radiation. The resulting film had good resistance to gasoline soak. The adhesive properties of the film are as follows:

TABLE 2

| Adhesive Properties | Thermal Cure Only 15 min Air Dry 8 min @ 200° F. | Thermal Cure + UV Cure ~1925 mJ/cm² |
| --- | --- | --- |
| 180° Peel Test (3 test avg., lb/in) | | |
| 15 min Dwell | 5.4 ± 0.4 (C) | 4.2 ± 0.3 (C) |
| 24 hr @ RT | 5.2 ± 0.3 (C) | 3.5 ± 0.4 (C) |
| 24 hr @ 160° F. | 5.8 ± 0.7 (C) | 6.2 ± 0.4 (gh) |

TABLE 2-continued

| Adhesive Properties | Thermal Cure Only 15 min Air Dry 8 min @ 200° F. | Thermal Cure + UV Cure ~1925 mJ/cm² |
| --- | --- | --- |
| 168 hr @ RT | 5.0 ± 0.3 (C) | 4.8 ± 0.3 (C) |
| 168 hr @ 160° F. | 7.6 ± 0.3 (TT) | 8.6 ± 0.4 (TT) |
| Tack Properties | | |
| Loop Tack (3 test avg., lb) | 2.4 (C) | 2.4 (C) |
| Polyken Probe Tack (3 test avg., g) | 672 | 424 |
| Shear Adhesion (hrs) 1" × 1" × 4 lbs (no dwell) | | |
| 1 | 19.1 (gh) | 496+ |
| 2 | 9.6 (gh) | 496+ |
| 3 | 84.3 (PT) | 496+ |

These results demonstrate that the inventive adhesive formulation maintained its adhesive properties (e.g., adhesion and tack) while greatly improving its shear adhesion. This improvement in shear adhesion coupled with its good gasoline resistance makes the inventive adhesive a prime candidate for use as a membrane switch in applications where solvent resistance (e.g., gasoline) is required.

What is claimed is:

1. A solvent-based pressure sensitive adhesive (PSA) having improved shear adhesion, which comprises:
   (a) an acrylic-based PSA resin;
   (b) fugative organic solvent for said acrylic-based PSA resin;
   (c) an ethylenically unsaturated polyester; and
   (d) an ultraviolet radiation (UV) photosensitizer. said ethylenically unsaturated polyester being curable in the presence of UV following removal of said solvent from said PSA.

2. The PSA of claim 1, wherein said an acrylic-based PSA resin is a copolymer synthesized from a $C_4$–$C_{18}$ alkyl (meth)acrylate monomer.

3. The PSA of claim 2, wherein said $C_4$–$C_{18}$ alkyl (meth)acrylate monomer is a $C_4$–$C_{12}$ alkyl (meth)acrylate monomer.

4. The PSA of claim 3, wherein said $C_4$–$C_{12}$ alkyl (meth)acrylate monomer is a mixture of n-butyl acrylate and 2-ethylhexyl acrylate.

5. The PSA of claim 1, wherein said fugative organic solvent for said acrylic-based PSA resin is one or more of an alcohols, an ester, an ether, or an aromatic solvent.

6. The PSA of claim 5, wherein said fugative organic solvent for said acrylic-based PSA resin is one or more of ethyl acetate, butyl acetate, methyl ethyl ketone, cyclohexanone, acetone, toluene, xylene, benzene, or cyclohexane.

7. The PSA of claim 6, wherein said fugative organic solvent for said acrylic-based PSA resin is a mixture of ethylacetate and toluene.

8. The PSA of claim 1, wherein said ethylenically unsaturated polyester is synthesized by reacting maleic anhydride with an alcohol.

9. The PSA of claim 1, wherein said ethylenically unsaturated polyester has a molecular weight of between about 1,000 and 100,000.

10. The PSA of claim 1, wherein said ultraviolet radiation (UV) photosensitizer is one or more of a halogenated polynuclear ketone; an organic carbonyl compounds selected from alkyl phenones, benzophenones, and tricyclic fused ring compounds; carbonylated phenol nuclear sulfonyl chlorides; or a combination of sensitizers comprising aromatic carbonyl compounds, aromatic aldehydes or aromatic ketones, and a synergistic sensitizer of about 0.05% to about 3% of 2,2'-dithiobis(benzothiazole).

11. A method for improving the shear adhesion of a solvent-based pressure sensitive adhesive (PSA) composed of an acrylic-based PSA resin and fugative organic solvent for said acrylic-based PSA resin, which comprises:

incorporating an ethylenically-unsaturated polyester and an ultraviolet radiation (UV) photosensitizer in with said PSA.

12. The method of claim 11, wherein said an acrylic-based PSA resin is a copolymer synthesized from a $C_4$–$C_{18}$ alkyl (meth)acrylate monomer.

13. The method of claim 12, wherein said $C_4$–$C_{18}$ alkyl (meth)acrylate monomer is a $C_4$–$C_{12}$ alkyl (meth)acrylate monomer.

14. The method of claim 13, wherein said $C_4$–$C_{12}$ alkyl (meth)acrylate monomer is a mixture of n-butyl acrylate and 2-ethylhexyl acrylate.

15. The method of claim 11, wherein said fugative organic solvent for said acrylic-based PSA resin is one or more of an alcohols, an ester, an ether, or an aromatic solvent.

16. The method of claim 15, wherein said fugative organic solvent for said acrylic-based PSA resin is one or more of ethyl acetate, butyl acetate, methyl ethyl ketone, cyclohexanone, acetone, toluene, xylene, benzene, or cyclohexane.

17. The method of claim 16, wherein said fugative organic solvent for said acrylic-based PSA resin is a mixture of ethylacetate and toluene.

18. The method of claim 11, wherein said ethylenically unsaturated polyester is synthesized by reacting maleic anhydride with an alcohol.

19. The method of claim 11, wherein said ethylenically unsaturated polyester has a molecular weight of between about 1,000 and 100,000.

20. The method of claim 11, wherein said ultraviolet radiation (UV) photosensitizer is one or more of a halogenated polynuclear ketone; an organic carbonyl compounds selected from alkyl phenones, benzophenones, and tricyclic fused ring compounds; carbonylated phenol nuclear sulfonyl chlorides; or a combination of sensitizers comprising aromatic carbonyl compounds, aromatic aldehydes or aromatic ketones, and a synergistic sensitizer of about 0.05% to about 3% of 2,2'-dithiobis(benzothiazole).

21. A method for adhering two substrates, which comprises:

(i) applying a pressure sensitive adhesive (PSA) to one or both of said substrates, said PSA comprising:
   (a) an acrylic-based PSA resin;
   (b) fugative organic solvent for said acrylic-based PSA resin;
   (c) an ethylenically unsaturated polyester; and
   (d) an ultraviolet radiation (UV) photosensitizer.

(ii) causing said solvent to evaporate from said applied PSA;

(iii) exposing said applied PSA to ultraviolet (UV) radiation to post-cure said polyester.

22. The method of claim 21, wherein said solvent is evaporated by application of heat to said applied PSA.

23. The method of claim 21, wherein said an acrylic-based PSA resin is a copolymer synthesized from a $C_4$–$C_{18}$ alkyl (meth)acrylate monomer.

24. The method of claim 23, wherein said $C_4$–$C_{18}$ alkyl (meth)acrylate monomer is a mixture of n-butyl acrylate and 2-ethylhexyl acrylate.

25. The method of claim 21, wherein said fugative organic solvent for said acrylic-based PSA resin is one or more of an alcohols, an ester, an ether, or an aromatic solvent.

26. The method of claim 25, wherein said fugative organic solvent for said acrylic-based PSA resin is one or more of ethyl acetate, butyl acetate, methyl ethyl ketone, cyclohexanone, acetone, toluene, xylene, benzene, or cyclohexane.

27. The method of claim 26, wherein said fugative organic solvent for said acrylic-based PSA resin is a mixture of ethylacetate and toluene.

28. The method of claim 21, wherein said ethylenically unsaturated polyester is synthesized by reacting maleic anhydride with an alcohol.

29. The method of claim 21, wherein said ethylenically unsaturated polyester has a molecular weight of between about 1,000 and 100,000.

30. The method of claim 21, wherein said ultraviolet radiation (UV) photosensitizer is one or more of a halogenated polynuclear ketone; an organic carbonyl compounds selected from alkyl phenones, benzophenones, and tricyclic fused ring compounds; carbonylated phenol nuclear sulfonyl chlorides; or a combination of sensitizers comprising aromatic carbonyl compounds, aromatic aldehydes or aromatic ketones, and a synergistic sensitizer of about 0.05% to about 3% of 2,2'-dithiobis(benzothiazole).

* * * * *